US012773829B2

(12) United States Patent
Yoon et al.

(10) Patent No.: US 12,773,829 B2
(45) Date of Patent: Oct. 27, 2026

(54) MOLDED BODY

(71) Applicant: LG Chem, Ltd., Seoul (KR)

(72) Inventors: Jung Hwan Yoon, Daejeon (KR); Dam Hyeok Im, Daejeon (KR); Jun Geun Um, Daejeon (KR); Jin Mi Jung, Daejeon (KR); Sung Nam Moon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 143 days.

(21) Appl. No.: 18/727,213

(22) PCT Filed: Sep. 15, 2023

(86) PCT No.: PCT/KR2023/013873

§ 371 (c)(1),
(2) Date: Jul. 8, 2024

(87) PCT Pub. No.: WO2024/090784

PCT Pub. Date: May 2, 2024

(65) Prior Publication Data

US 2025/0100233 A1 Mar. 27, 2025

(30) Foreign Application Priority Data

Oct. 28, 2022 (KR) ........................ 10-2022-0141268

(51) Int. Cl.

| | |
|---|---|
| ***B29C 70/12*** | (2006.01) |
| ***B29C 70/44*** | (2006.01) |
| ***B29C 70/46*** | (2006.01) |
| *B29K 101/12* | (2006.01) |
| *B29K 105/12* | (2006.01) |
| *B29L 31/18* | (2006.01) |

(52) U.S. Cl.

CPC .............. *B29C 70/12* (2013.01); *B29C 70/44* (2013.01); *B29C 70/46* (2013.01);
(Continued)

(58) Field of Classification Search

CPC ...... B29C 2043/3605; B29C 2043/562; B29C 2043/563; B29C 48/0017; B29C 70/12;
(Continued)

(56) References Cited

U.S. PATENT DOCUMENTS 10,087,073 B2 10/2018 Lin et al.
2003/0030188 A1* 2/2003 Spengler ............... B29C 43/183 264/102
(Continued)

FOREIGN PATENT DOCUMENTS

EP 1284182 B1 11/2014
JP S6354231 A 3/1988
(Continued)

OTHER PUBLICATIONS

Extended European Search Report including Written Opinion for Application No. 23882891.7 dated Apr. 24, 2025. 10 pages.
(Continued)

*Primary Examiner* — Monica A Huson
(74) *Attorney, Agent, or Firm* — Lerner David LLP

(57) ABSTRACT

A molded body has a concavo-convex shape with intaglio portions and raised portions and has uniform physical properties in the intaglio portions and the raised portions. A method for manufacturing the plate-like molded body includes a molding step of placing a raw fabric including a resin component and a filler component on intaglios of a mold, and the intaglios correspond to the concavo-convex shape. The method also includes applying pressure at a top of the raw fabric while suctioning the raw fabric at a bottom of the mold.

15 Claims, 7 Drawing Sheets

(52) U.S. Cl.
CPC .... *B29K 2101/12* (2013.01); *B29K 2105/122* (2013.01); *B29K 2995/0077* (2013.01); *B29K 2995/0097* (2013.01); *B29L 2031/18* (2013.01)

(58) Field of Classification Search
CPC ....... B29C 51/02; B29C 51/082; B29C 51/46; B29C 70/18; B29C 70/44; B29C 70/58; B29C 48/022; B29C 48/07; B29C 48/2886; B29C 51/002; B29C 51/42; B29C 2043/3238; B29C 2791/007; B29D 7/00; H10W 40/251; H10W 40/257; H10W 70/027; B29K 2071/12; B29K 2101/12; B29K 2105/06; B29K 2105/122; B29K 2995/0077; B29K 2995/0097; B29L 2031/18; H01L 2924/00; H01L 2924/0002
See application file for complete search history.

(56) References Cited

U.S. PATENT DOCUMENTS

| | | | | |
|---|---|---|---|---|
| 2009/0039556 | A1 | 2/2009 | Sawada et al. | |
| 2013/0257264 | A1 | 10/2013 | Tamaki et al. | |
| 2014/0224466 | A1* | 8/2014 | Lin | B82Y 30/00 165/185 |
| 2015/0266260 | A1 | 9/2015 | Fujioka et al. | |
| 2017/0334146 | A1 | 11/2017 | Suzuki | |
| 2019/0168467 | A1 | 6/2019 | Tseng et al. | |
| 2020/0031022 | A1 | 1/2020 | Kitayama et al. | |

FOREIGN PATENT DOCUMENTS

| | | | |
|---|---|---|---|
| JP | H02124942 | A | 5/1990 |
| JP | H0421438 | A | 1/1992 |
| JP | H05318572 | A | 12/1993 |
| JP | 2003055011 | A | 2/2003 |
| JP | 6767511 | B2 | 10/2020 |
| JP | 6852933 | B1 | 3/2021 |
| JP | 7044735 | B2 | 3/2022 |
| KR | 19990029420 | A | 4/1999 |
| KR | 20070017144 | A | 2/2007 |
| KR | 20070118302 | A | 12/2007 |
| KR | 20130110101 | A | 10/2013 |

OTHER PUBLICATIONS

International Search Report for Application No. PCT/KR2023/013873 mailed Jan. 11, 2024. 4 pages.

* cited by examiner

[Figure 1]
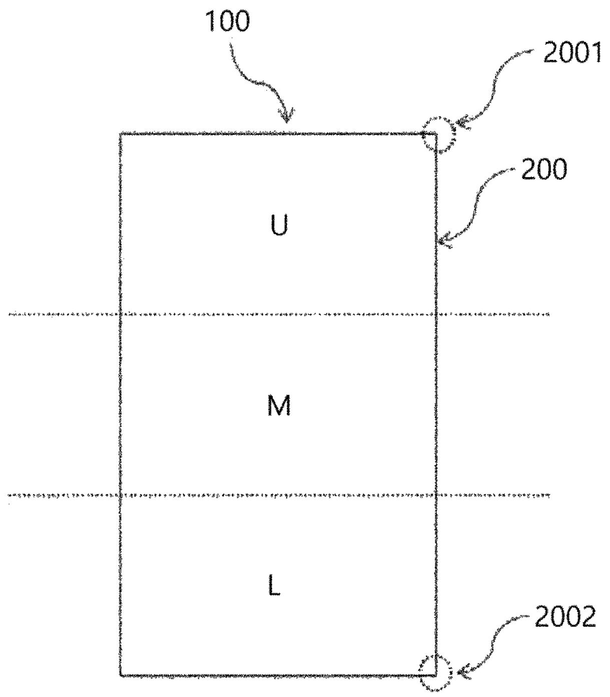
[Figure 2]
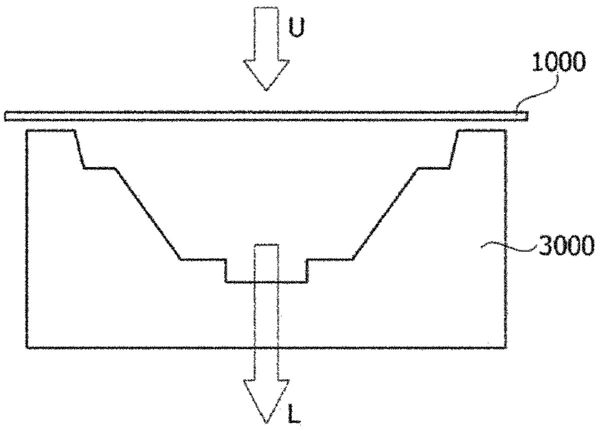

[Figure 3]
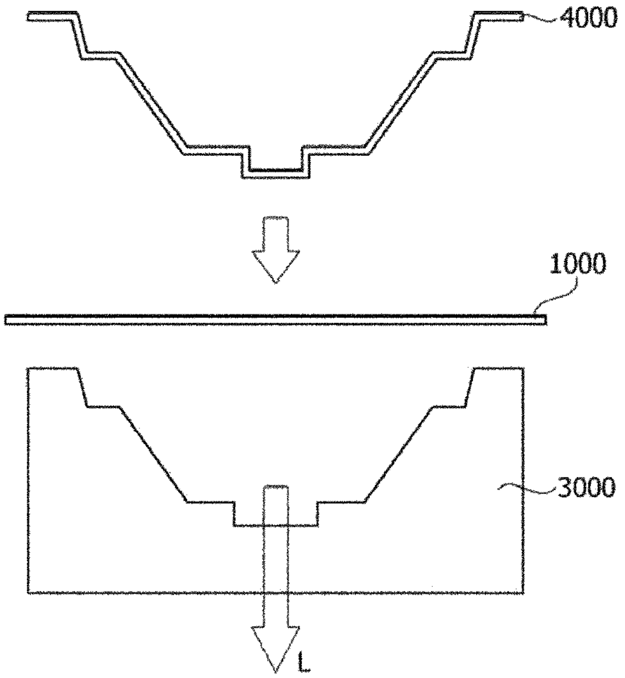
[Figure 4]
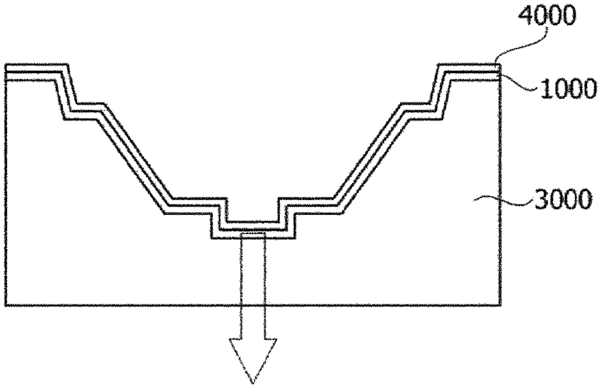

[Figure 5]
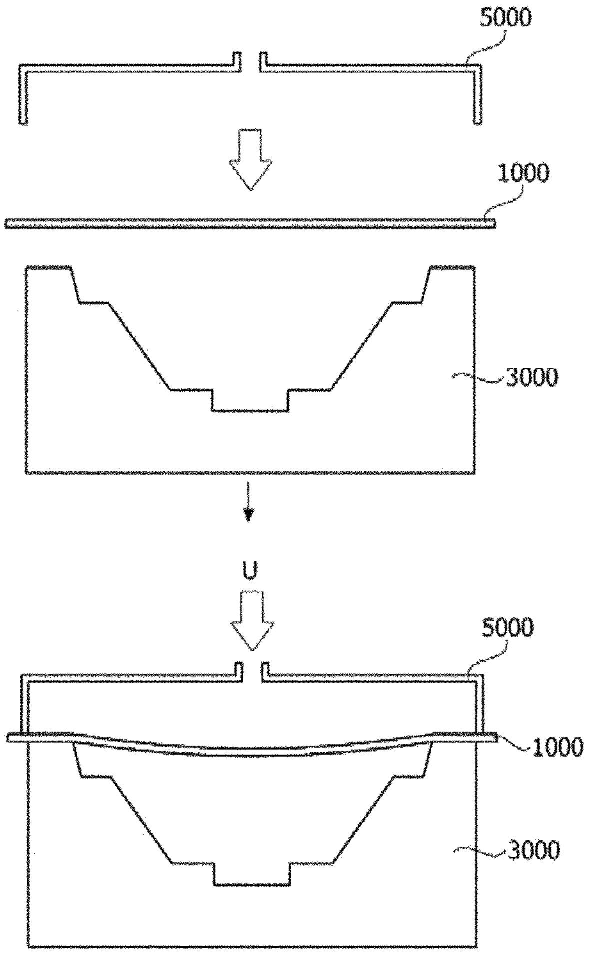

[Figure 6]
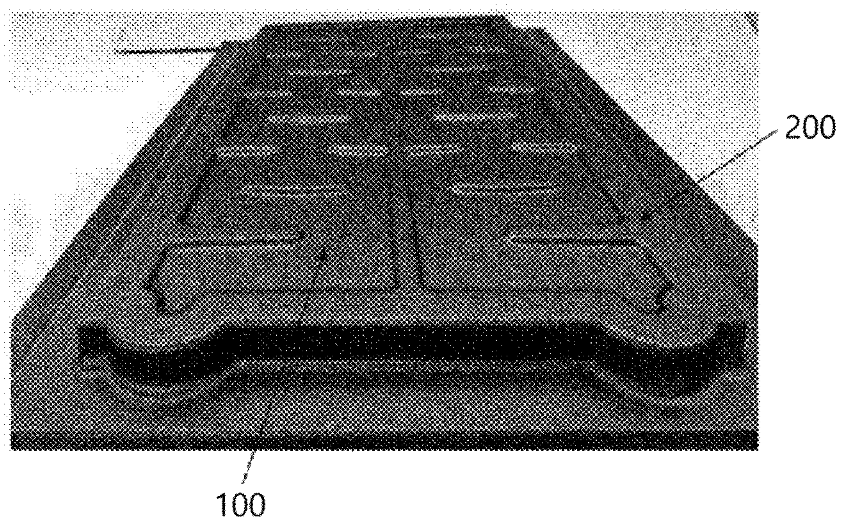
[Figure 7]
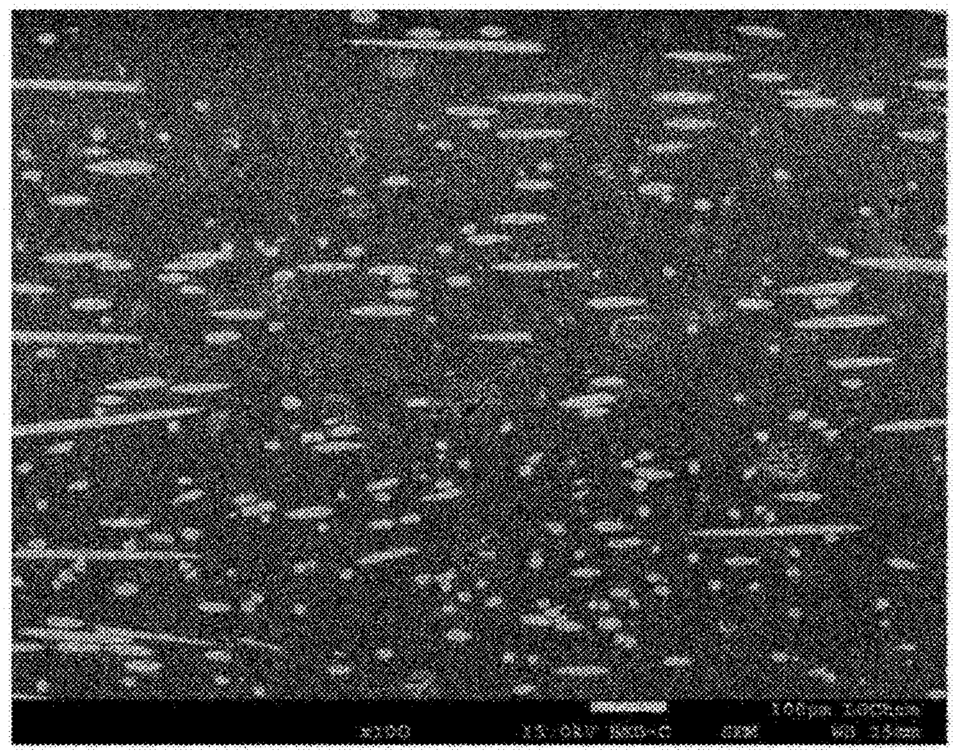

[Figure 8]
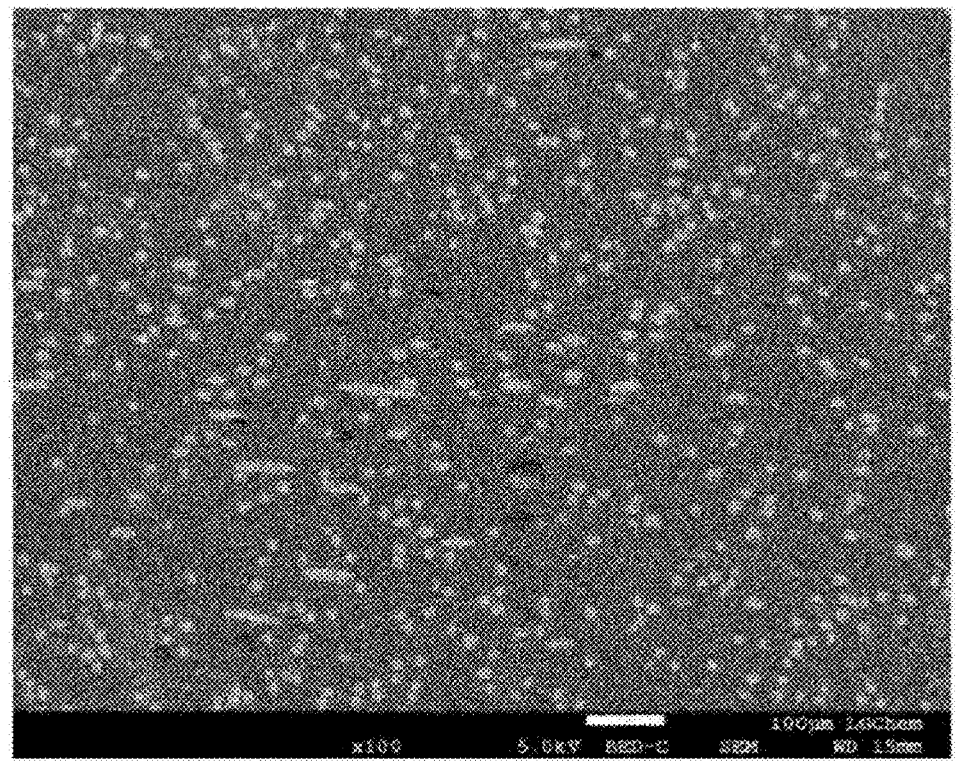

[Figure 9]
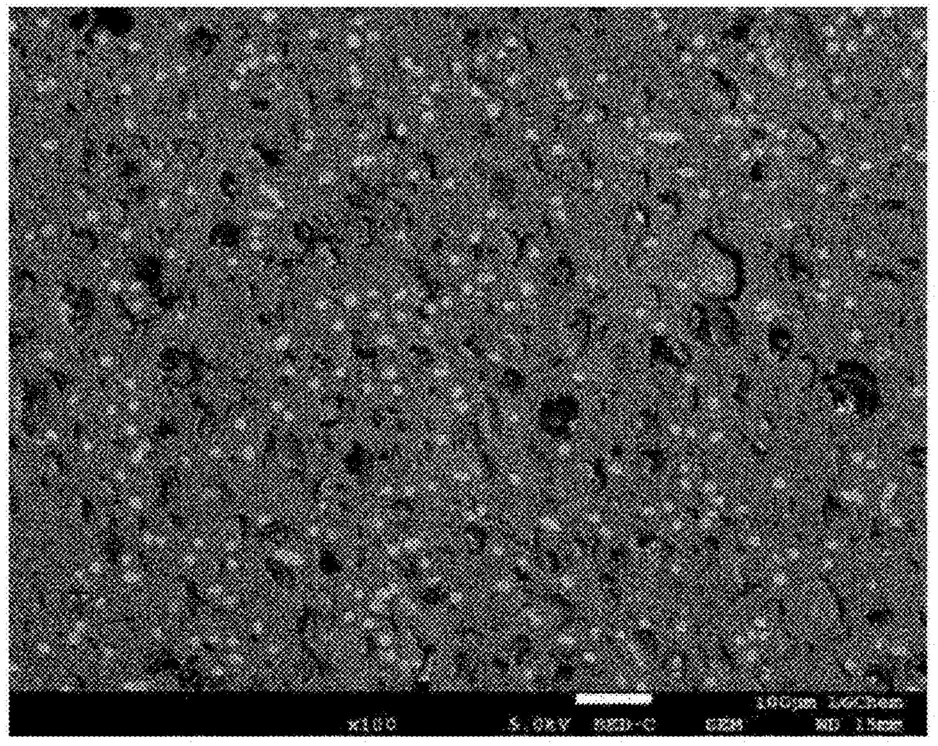

[Figure 10]
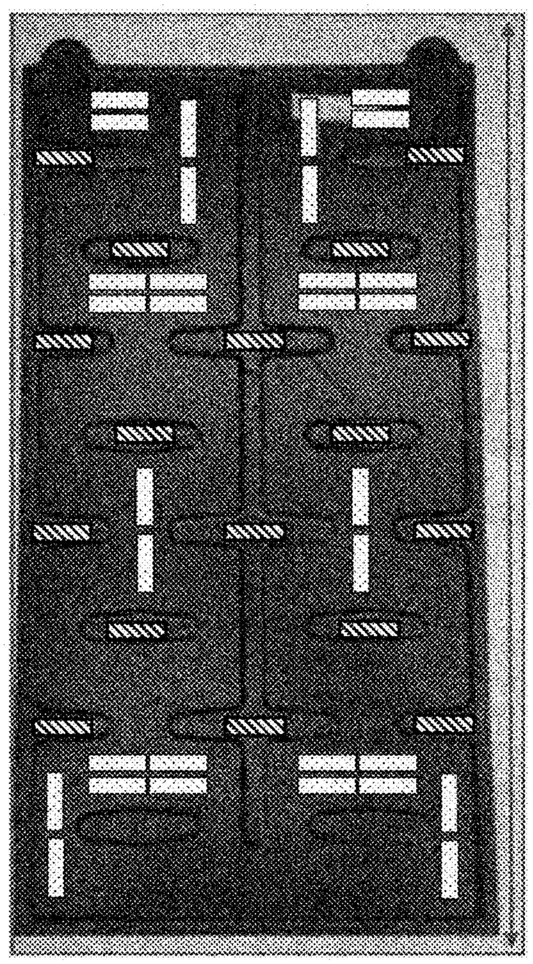

MOLDED BODY

CROSS-REFERENCE TO RELATED APPLICATION

This application is a national phase entry under 35 U.S.C. § 371 of International Application No. PCT/KR2023/013873 filed on Sep. 15, 2023, which claims priority from Korean Patent Application No. 10-2022-0141268 filed on Oct. 28, 2022 in the Korean Intellectual Property Office, the disclosures of which are incorporated by reference herein.

TECHNICAL FIELD

The present application relates to a molded body, a manufacturing method thereof, and a use of the molded body.

BACKGROUND ART

Various methods for molding plastics such as thermoplastic resin components are known, and an example thereof includes extrusion molding, injection molding, or hollow molding, and the like.

Among the above molding methods, the most widely used method for producing molded bodies with irregularities is injection molding or hollow molding.

The injection molding is a method of injecting molten raw materials into a mold, cooling them, and then completing a shape while opening the mold to eject it, and is often used because it is possible to mold a complicated shape.

The hollow molding is often used to mainly manufacture a bottle-shaped molded body, wherein the molded body is completed by placing a preform in a mold, and momentarily injecting pressurized air thereto.

However, such molding methods have the following disadvantages.

Even if the injection molding method, the hollow molding method, or any of other molding methods is used, in a process of manufacturing a molded body having a concavo-convex shape, different pressures are applied to intaglio portions and raised portions of the concavo-convex shape. Therefore, in the manufactured molded body, there is a high possibility that variations in physical properties occur in the intaglio portions and the raised portions.

To improve the mechanical properties of the molded body, reinforcing materials can be formulated in the resin component, but in this case, the above problems are further highlighted.

When the resin component and the reinforcing material are mixed, pores may be formed at the interface between the resin component and the reinforcing material due to the pressure applied during the molding process. In the process of manufacturing a concavo-convex shaped molded body having intaglio portions and raised portions, such differences in pore size or density, and the like occur to be larger in the intaglio portions and the raised portions, and thus the differences in physical properties between the intaglio portions and the raised portions may become larger.

DESCRIPTION OF DRAWINGS

FIG. 1 is a diagram of a method of trisecting a molded body.

FIG. 2 is a diagram of a method for manufacturing a molded body of the present application.

FIGS. 3 and 4 are diagrams of a method of applying pressure to the molded body of FIG. 2 using a second mold.

Figure to 5 is a diagram of a method of applying pressure to the molded body of FIG. 2 using sprayed gas.

FIG. 6 is a photograph of a molded body manufactured in an example.

FIG. 7 is an SEM image of the molded body of Example 1.

FIG. 8 is an SEM image of the molded body of Example 2.

FIG. 9 is an SEM image of the molded body of Comparative Example 1.

FIG. 10 is a photograph of a portion of a molded body for tensile rupture strength measurement.

TECHNICAL PROBLEM

It is an object of the present application to provide a molded body, a manufacturing method thereof, and a use of the molded body. It is a main object of the present application to provide a molded body including a concavo-convex shape having intaglio portions and raised portions and having uniform physical properties in the intaglio portions and the raised portions, a method for manufacturing the molded body, and a use of the molded body. It is a main object of the present application to provide a molded body including a concavo-convex shape having intaglio portions and raised portions, a molded body in which physical properties of a raw fabric for manufacturing the molded body are stably maintained, a method for manufacturing the molded body, and a use of the molded body.

Technical Solution

The present application relates to a molded body. The molded body may be manufactured to have a desired shape using plastics such as thermoplastic resins as a raw material.

The molded body may comprise at least a resin component and a filler component.

The type of resin component included in the molded body is not particularly limited, and for example, the required type is appropriately selected among resin components known to be moldable, and used. For example, the resin component may comprise a thermoplastic polymer. The type of thermoplastic polymers applicable in this process may include various crystalline or amorphous polymers, and an example thereof may be polyolefin-based polymers such as PP (polypropylene) or PE (polyethylene), polyalkylene oxide-based polymers such as mPPO (modified PPO (polyethylene oxide)), polyamide-based polymers such as PA (polyamide), acetal-based polymers such as POM (polyoxymethylene), polyester-based polymers such as PC (polycarbonate), PBT (polybutylene terephthalate), or PET (polyethylene terephthalate), acrylic-based polymers, such as PMMA (poly(methyl methacrylate)), polystyrene-based polymers, such as PS (polystyrene) or ABS (acrylonitrile butadiene styrene), and the like, but is not limited thereto.

The resin component may have a unique glass transition temperature (Tg) depending on the type. Although not particularly limited, the lower limit of the glass transition temperature of the resin component applied in the present application may be 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., or 145° C. or so, and the upper limit thereof may be 500° C., 450° C., 400° C., 350° C., 300° C., 250° C., 200° C., or 150° C. or so. The glass transition temperature of the resin component may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits.

The ratio of the resin component in the molded body is not particularly limited, which may be adjusted to an appropriate ratio depending on the purpose. For example, the lower limit of the ratio of the resin component in the molded body may be 50 wt %, 55 wt %, 60 wt %, 65 wt %, 70 wt %, 75 wt %, 80 wt %, 85 wt %, 90 wt %, or 95 wt % or so, and the upper limit thereof may be 100 wt %, 95 wt %, 90 wt %, 85 wt %, 80 wt %, 75 wt %, 70 wt %, 65 wt %, 60 wt %, or 55 wt % or so. The ratio of the resin component may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits.

The molded body may comprise a filler component as an additional component. Such a filler component may be included, for example, as a reinforcing material.

An example of the applicable filler component is not particularly limited. For example, an organic filler, an inorganic filler, or an organic-inorganic filler, such as a glass filler, a carbon filler, and/or a silica filler may be applied.

The shape of the filler is not particularly limited. For example, the filler may be a particulate filler (spherical, rectangular, amorphous, or other shaped particulate filler), a plate-like filler, or a fibrous filler.

The lower limit of the size of such a filler may be, for example, 1 μm, 5 μm, or 10 μm or so, and the upper limit thereof may be 100 μm, 95 μm, 90 μm, 85 μm, 80 μm, 75 μm, 70 μm, 65 μm, 60 μm, 55 μm, 50 μm, 45 μm, 40 μm, 35 μm, 30 μm, 25 μm, 20 μm, or 15 μm or so. The size of the filler may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits.

The size of the filler may be an average diameter of the relevant filler (D50 particle diameter median diameter) when the filler is a particulate filler, may be a thickness of the relevant filler or a long side or a short side in the direction perpendicular to the thickness direction of the filler when the filler is a plate-like filler, and may be a diameter of the cross section of the filler when it is a fibrous filler.

In one example, the filler may be a fibrous filler. In the case of fibrous filler, it has a large aspect ratio, so that it exhibits orientation during the manufacturing process of the molded body, and thus the physical properties of the molded body may more easily become non-uniform depending on the applied pressure, but if the method of the present application is applied, it is possible to manufacture a molded body with uniform physical properties even in the case of fibrous filler.

In the case of fibrous filler, the lower limit of the aspect ratio of the filler may be 3, 5, 7, 9, 10, 12, 14, 16, 18, 20, 22, or 24 or so, and the upper limit thereof may be 60, 55, 50, 45, 40, 35, 30, or 25 or so. The aspect ratio may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits. The aspect ratio of the fibrous filler is a value obtained by dividing the length of the filler by the cross-sectional diameter of the filler.

In the case of fibrous fillers, the lower limit of the cross-sectional diameter of the filler may be, for example, 1 μm, 5 μm, or 10 μm or so, and the upper limit thereof may be 100 μm, 95 μm, 90 μm, 85 μm, 80 μm, 75 μm, 70 μm, 65 μm, 60 μm, 55 μm, 50 μm, 45 μm, 40 μm, 35 μm, 30 μm, 25 μm, 20 μm, or 15 μm or so. The cross-sectional diameter of the fibrous filler may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits.

The lower limit of the weight ratio of the filler component relative to 100 parts by weight of the resin component in the molded body may be 1 part by weight, 5 parts by weight, 10 parts by weight, 15 parts by weight, 20 parts by weight, or 25 parts by weight or so, and the upper limit thereof may be 100 parts by weight, 95 parts by weight, 90 parts by weight, 85 parts by weight, 80 parts by weight, 75 parts by weight, 70 parts by weight, 65 parts by weight, 60 parts by weight, 55 parts by weight, 50 parts by weight, 45 parts by weight, 40 parts by weight, 35 parts by weight, 30 parts by weight, or 25 parts by weight or so. The weight ratio of the filler component may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits. In addition, considering the desired physical properties, the weight ratio of the filler component may be changed within or outside the above-described range.

The molded body of the present application comprising the above components may be a plate-like molded body, or may also be a molded body having a concavo-convex shape formed by including raised portions and intaglio portions.

When manufacturing a molded body having such a concavo-convex shape by the existing molding method, differences in physical properties easily occur in the intaglio portions and the raised portions of the molded body, and when the molded body comprises a reinforcing material such as a filler component, the differences become even larger.

The specific form of the concavo-convex shape, for example, the depth, height, area, form and/or number of the intaglio or raised shape, is not particularly limited, and an appropriate form of concavo-convex shape may be applied considering the purpose to which the molded body is applied.

However, in the present application, it is possible to provide a molded body showing equal physical properties in the intaglio portions and the raised portions through a molding method to be described below.

For example, in the molded body, the absolute value of the difference between the tensile rupture strength of the concave portion and the tensile rupture strength of the raised portion may be adjusted within a predetermined range.

A method of measuring the tensile rupture strength mentioned in this specification is summarized in Examples. The tensile rupture strength can be measured at room temperature (about 25° C.) using a UTM (Universal Testing Machine) device on a specimen cut to have a horizontal length of about 45 mm and a vertical length of about 12.5 mm.

The horizontal direction of the specimen may be a direction parallel to an MD (Machine Direction) or TD (Transverse Direction) of the raw fabric. Here, the MD and TD mean the MD and TD directions of the raw fabric to be described below, which mean the MD and TD directions during an extrusion process of manufacturing a raw fabric.

Both ends of the specimen in the transverse direction are fixed to the device by about 8 mm, the specimen is stretched in the horizontal direction at a speed of about 50 mm/sec, and simultaneously a strength at time points when the specimen is ruptured is measured, where the strength is referred to as the tensile rupture strength.

When the tensile rupture strength of the intaglio portion is $S_M$ and the tensile rupture strength of the raised portion is $S_P$, the difference between the tensile rupture strength of the intaglio portion and the tensile rupture strength of the raised portion is a value calculated as $100\times(S_P-S_M)/S_M$, and its unit is %.

The upper limit of the absolute value of the difference in tensile rupture strength between the raised portion and the intaglio portion may be 10%, 9%, 8%, 7%, 6%, 5%, 4%, 3%, 2%, or 1% or so, and the lower limit thereof may be 0%, 0.5%, 1%, 1.5%, 2%, 2.5%, 3%, or 3.5% or so. The absolute value of the difference in tensile rupture strength between the raised portion and the intaglio portion may be less than, or less than or equal to any one of the above-described upper limits, or may be within a range of less than, or less than or equal to any one of the above-described upper limits while being more than or equal to, or more than any one of the above-described lower limits.

The molded body of the present application may also be manufactured to have physical properties like the physical properties of the raw fabric. Here, the raw fabric means a material in the form of a film or sheet applied to manufacture the molded body having the concavo-convex shape. That is, a process of manufacturing a molded body of the present application may comprise a molding step of applying a material containing the resin component and the filler component to an extrusion process to manufacture a plate material (sheet or film), and forming concavo-convex portions on this plate material. If many pores are generated at the interface between the resin component and the filler component inside the plate material due to the pressure applied during the molding process, the physical properties of the final molded body may be different from the physical properties of the previous plate material. However, when the method of the present application is applied, it is possible to manufacture a molded body while minimizing or eliminating changes in the physical properties of the raw fabric.

For example, in the molded body, a change ratio of tensile rupture strength compared to the raw fabric may be a predetermined range or more. Here, when the tensile rupture strength of the raw fabric is $S_R$ and the tensile rupture strength of the molded body is $S_S$, the change ratio of tensile rupture strength compared to the raw fabric is a value calculated as $100\times S_S/S_R$, and its unit is %. In addition, here, the tensile rupture strength $S_S$ of the molded body may be the tensile rupture strength of the intaglio portion or the raised portion of the molded body, or may be the arithmetic average of the tensile rupture strengths of the intaglio portion and the raised portion.

The lower limit of the change ratio of the tensile rupture strength in the molded body may be 70%, 72%, 74%, 76%, 78%, 80%, 82%, 84%, 86%, 88%, 90%, 92%, 94%, 96%, or 98% or so, and the upper limit thereof may be 100%, 98%, 96%, 94%, 92%, 90%, 88%, 86%, 84%, or 82% or so. The change ratio of the tensile rupture strength may be more than, or more than or equal to any one of the above-described lower limits, or may be within a range of less than, or less than or equal to any one of the above-described upper limits while being more than or equal to, or more than any one of the above-described lower limits.

In the molded body, the intaglio portion or the raised portion may have a certain level of tensile rupture strength.

For example, the lower limit of the tensile rupture strength of the intaglio portion or the raised portion of the molded body may be 50 MPa, 52 MPa, 54 MPa, 56 MPa, 58 MPa, 60 MPa, 62 MPa, 64 MPa, 66 MPa, 68 MPa, 70 MPa, 72 MPa, 74 MPa, 76 MPa, 78 MPa, 80 MPa, 82 MPa, or 84 MPa or so, and the upper limit thereof may be 1000 MPa, 950 MPa, 900 MPa, 850 MPa, 800 MPa, 750 MPa, 700 MPa, 650 MPa, 600 MPa, 550 MPa, 500 MPa, 450 MPa, 400 MPa, 350 MPa, 300 MPa, 250 MPa, 200 MPa, 150 MPa, 100 MPa, or 90 MPa or so. The tensile rupture strength may be more than or equal to, or more than any one of the above-described lower limits, or may be within a range of less than, or less than or equal to any one of the above-described upper limits while being more than or equal to, or more than any one of the above-described lower limits.

The molded body of the present application may have uniform physical properties entirely. That is, during a manufacturing process of a molded body, different levels of pressures may be applied to the intaglio and raised shapes of the concavo-convex shape, but even in the case of the same intaglio or raised shape, different pressures may be applied depending on the portion, thereby being capable of causing deviations in physical properties. However, when the method of the present application is applied, the molded body can have uniform physical properties entirely.

For example, when the plate-like molded body of the present application has sides formed in a first direction, the standard deviation of the tensile rupture strength of each of upper, middle, and lower ends obtained by trisecting the molded body in a direction perpendicular to the side in the first direction may be controlled in a certain level or less.

The first direction is a direction parallel to an arbitrary side of the plate-like molded body when the plate-like molded body is observed along the thickness direction of the molded body. For example, referring to FIG. 1, if the molded body has a rectangular shape as in FIG. 1, the direction of the horizontal side (100) or the vertical side (200) of the relevant rectangle may be the first direction. In FIG. 1, the molded body is divided into three parts in a direction perpendicular to the side of the first direction with the vertical side (200) as the first direction, and an upper end (U), a middle part (M), and a lower end (L) are defined. The results are shown in dotted lines. In some cases, when the side of the molded body is not in the form of a straight line, the direction of a virtual straight line connecting both end points (2001, 2002 in the case of FIG. 1) of the side may be set as the first direction.

Here, the trisection of the molded body along the first direction may mean that the molded body are divided so that the upper end (U), the middle part (M), and the lower end (L) have the same area.

Meanwhile, when the tensile rupture strengths of the upper end, middle end, and lower end are set to $S_U$, $S_M$, and $S_L$, respectively and the arithmetic mean is set to A, the standard deviation is a value calculated as $\{[(S_U-A)^2+(S_M-A)^2+(S_L-A)^2]/3\}^{0.5}$.

In a suitable example, the upper limit of the standard deviation of the tensile rupture strength of each of the upper end, middle end, and lower end may be 100, 95, 90, 85, 80, 75, 70, 65, 60, 55, 50, 45, 40, 35, 30, 25, 20, or 15 or so, and the lower limit thereof may be 0, 2, 4, 6, 8, 10, 12, or 14 or so. The standard deviation may be less than, or less than or equal to any one of the above-described upper limits, or may be within a range of less than, or less than or equal to any one of the above-described upper limits while being more than or equal to, or more than any one of the above-described lower limits.

The molded body of the present application may have any two physical properties selected from the above-mentioned change ratio in tensile rupture strength, the tensile rupture strength, the absolute value of the difference between the tensile rupture strengths of the raised portion and the intaglio portion, and the standard deviation of the tensile rupture strength of each of the upper end, middle end, and lower end, and in some cases, it may also satisfy all the above physical properties.

The thickness of such a molded body may be adjusted to an appropriate level depending on the purpose, which is not greatly limited. For example, the lower limit of the thickness of the molded body may be 100 μm, 500 μm, 1,000 μm, 1,500 μm, or 2,000 μm or so, and the upper limit thereof may be 100 mm, 95 mm, 90 mm, 85 mm, 80 mm, 75 mm, 70 mm, 65 mm, 60 mm, 55 mm, 50 mm, 45 mm, 40 mm, 35 mm, 30 mm, 25 mm, 20 mm, 15 mm, 10 mm, 8 mm, 6 mm, 4 mm, or 2 mm or so. The thickness may be more than, or more than or equal to any one of the above-described lower limits, may be less than or equal to, or less than any one of the above-described upper limits, or may be within a range of less than, or less than or equal to any one of the above-described upper limits while being more than or equal to, or more than any one of the above-described lower limits.

Such a molded body may be used for various applications, an example of which is a so-called heat sink. As is known, the heat sink is a component that can absorb or dissipate heat from another object through a direct or indirect thermal contact. Since it is advantageous for such a heat sink to have as wide a surface area as possible, the molded body having the concavo-convex shape as described above can be advantageously used as the heat sink.

The heat sink may comprise at least the above-described plate-like molded body. The heat sink may be composed of only the plate-like molded body, or may comprise the plate-like molded body and other necessary materials together.

The above-described contents, such as a heat sink, may be equally to the content of the plate-like molded body. For example, the contents of the resin component and the filler component, or the contents of the absolute value of the difference in tensile rupture strength between the intaglio portion and the raised portion, the change ratio in tensile rupture strength compared to the raw fabric, the standard deviation of the tensile rupture strength of each of the upper end, middle end, and lower end obtained by trisecting it, and the thickness of the plate-like molded body.

The present application also relates to a method for manufacturing such a molded body.

The manufacturing method of the present application may comprise a step of manufacturing a plate-like molded body having a concavo-convex shape including raised portions and intaglio portions by molding a sheet or a film comprising the resin component and the filler component.

Here, the sheet or film comprising the resin component and the filler component may be the above-described raw fabric. Such a raw fabric may be manufactured by applying a material comprising the resin component and the filler component to a known molding process, for example, an extrusion process, and the like. The specific types and formulation ratios of the resin component and filler component used in manufacturing the raw fabric are the same as the contents described in the molded body.

Such a raw fabric may be in the form of a sheet or film, as described above.

In this case, the thickness of the raw fabric may be adjusted to an appropriate level depending on the purpose, which is not greatly limited. For example, the lower limit of the thickness of the raw fabric may be 100 μm, 500 μm, 1,000 μm, 1,500 μm, or 2,000 μm or so, and the upper limit thereof may be 100 mm, 95 mm, 90 mm, 85 mm, 80 mm, 75 mm, 70 mm, 65 mm, 60 mm, 55 mm, 50 mm, 45 mm, 40 mm, 35 mm, 30 mm, 25 mm, 20 mm, 15 mm, 10 mm, 8 mm, 6 mm, 4 mm, or 2 mm or so. The thickness may be more than, or more than or equal to any one of the above-described lower limits, may be less than or equal to, or less than any one of the above-described upper limits, or may be within a range of less than, or less than or equal to any one of the above-described upper limits while being more than or equal to, or more than any one of the above-described lower limits.

The present application performs a molding step of forming the concavo-convex shape using the raw fabric.

In the molding step, as shown in FIG. 2, a mold (3000) having an intaglio corresponding to the desired concavo-convex shape is used. The intaglio shape of the mold may be determined according to the concavo-convex shape.

In the molding step, a step of placing the raw fabric (1000) at the top of the mold (3000) and suctioning the raw fabric at the bottom of the mold (3000) (applying a suction force in the L direction in FIG. 2) may be performed. In this process, a pressure is applied to the raw fabric (1000) by the applied suction force.

In the molding step, while the suction force is applied as above, the pressure may be applied at the top of the raw fabric simultaneously (U direction in FIG. 2).

In this way, by performing the molding process while applying the force at the top and bottom of the raw fabric (1000), it is possible to effectively manufacture the desired molded body.

Here, the method of applying the force from the top of the raw fabric (1000) is not particularly limited, but it can be performed by any one of two methods below.

For example, as shown in FIGS. 3 and 4, the pressure application from the top may be performed using an additional mold (4000) (hereinafter, referred to as a second mold). That is, the pressure may be applied by a method of preparing a second mold (4000) having a raised shape corresponding to an intaglio of the mold (3000) in which the intaglio corresponds to the concavo-convex shape, and moving the second mold (4000) toward the raw fabric (1000) to press the raw fabric (1000), as shown in FIGS. 3 and 4.

In another example, for example, the pressure application from the top may also be performed by spraying gas at the top of the raw fabric.

Such an example is shown in FIG. 5. As shown in FIG. 5, the pressure may be applied by covering a cover (5000) or the like to form a closed space, and then spraying gas (U) such as air from the top.

In the molding step, the temperature of the raw fabric, for example, the surface temperature of the raw fabric may be adjusted, and specifically, the temperature of the raw fabric may be adjusted so that the absolute value of ΔT according to Equation 1 below is within a predetermined range.

$$\Delta T = 100 \times (Ts - Tg)/Tg \quad \text{[Equation 1]}$$

In Equation 1, Ts is the surface temperature of the raw fabric in the molding step, and Tg is the glass transition temperature of the resin component.

For example, the upper limit of the absolute value of ΔT may be 50%, 48%, 46%, 44%, 42%, 40%, 38%, 36%, 34%, 32%, 30%, 28%, 26%, 24%, or 22% or so, and the lower limit thereof may be 0%, 5%, 10%, 15%, or 20% or so. AT in Equation 1 above may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits.

The surface temperature (Ts) of the raw fabric may be higher or lower than the glass transition temperature of the resin component if it satisfies the range of the absolute value of ΔT in Equation 1 above.

The method of controlling the surface temperature of the raw fabric is not particularly limited, and for example, it may be adjusted using a known heater such as a ceramic heater or a coil heater.

Also, in the above process, the relationship between the suction force applied at the bottom of the raw fabric and the pressure applied at the top of the raw fabric may also be adjusted.

For example, the suction from the bottom and the pressure application from the top may be controlled so that the absolute value of ΔP according to Equation 2 below is within a predetermined range.

$$\Delta P = 100 \times (P_U - P_L)/P_L \quad \text{[Equation 2]}$$

In Equation 2, $P_U$ is the pressure applied to the raw fabric by the pressure applied at the top of the raw fabric in the molding step, and $P_L$ is the pressure applied to the raw fabric by the suction at the bottom of the raw fabric.

For example, the upper limit of the absolute value of ΔP in Equation 2 above may be 100%, 95%, 90%, 85%, 80%, 75%, 70%, 65%, 60%, 55%, 50%, 45%, 40%, 35%, 30%, 25%, 20%, 15%, or 5% or so, and the lower limit may also be 0%, 5%, 10%, 15%, 20 25%, 30%, 35%, 40%, 45%, 50%, 55%, or 60% or so. AP in Equation 2 above may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits.

The force $P_U$ in Equation 2 means the instantaneous load applied to the raw fabric when only the suction force is applied, and $P_L$ means the instantaneous load applied to the raw fabric when only the pressure is applied.

ΔP in Equation 2 above may be a positive number or a negative number as long as its absolute value satisfies the above range.

Here, the lower limit of the pressure ($P_L$ in Equation 2) applied to the raw fabric by the suction applied at the bottom of the raw fabric may be 100 gf/cm², 150 gf/cm², 200 gf/cm², 250 gf/cm², 300 gf/cm², 350 gf/cm², 400 gf/cm², 450 gf/cm², 500 gf/cm², 550 gf/cm², 600 gf/cm², or 650 gf/cm² or so, and the upper limit thereof may also be 2000 gf/cm², 1900 gf/cm², 1800 gf/cm², 1700 gf/cm², 1600 gf/cm², 1500 gf/cm², 1400 gf/cm², 1300 gf/cm², 1200 gf/cm², 1100 gf/cm², 1000 gf/cm², 950 gf/cm², 900 gf/cm², 850 gf/cm², 800 gf/cm², 750 gf/cm², or 700 gf/cm² or so. The force may be more than or equal to, or more than any one of the above-described lower limits, may be less than, or less than or equal to any one of the above-described upper limits, or may be within a range of less than, or less than or equal to any one of the above-described upper limits while being more than or equal to, or more than any one of the above-described lower limits.

Through the above process, the molded body of the present application can be manufactured. The method of the present application may further comprise any steps necessary in addition to the above process. For example, in the method, a step of fixing the molded shape through a cooling process or the like may be additionally performed after the molding step.

Advantageous Effects

The present application can provide a molded body, a manufacturing method thereof, and a use of the molded body. The present application can provide a molded body including a concavo-convex shape having intaglio portions and raised portions, and having uniform physical properties in the intaglio portions and the raised portions, a method for manufacturing the molded body, and a use of the molded body. The present application can provide a molded body including a concavo-convex shape having intaglio portions and raised portions, a molded body in which physical properties of a raw fabric for manufacturing the molded body are stably maintained, a method for manufacturing the molded body, and a use of the molded body.

EXAMPLES

Hereinafter, the present application will be described in detail through examples below, but the scope of the present application is not limited by the following examples.

Example 1

A molded body having a concavo-convex shape formed by an intaglio shape (100) and a raised shape (200) as in FIG. 6 was manufactured in the following manner. The molded body in FIG. 1 is in the form of a rectangular plate, and has a horizontal length of about 608 mm, a vertical length of about 308 mm, and a thickness of about 2 mm, which can be used as a heat sink.

First, a raw fabric was manufactured. The raw fabric was manufactured to have a thickness of about 2 mm or so by applying a material, in which mPPO (modified PPO (Polyethylene oxide)) as a resin component and glass fiber a filler component were formulated in a weight ratio of 8:2 (mPPO: filler component), to an extrusion process.

The mPPO as the resin component had a glass transition temperature of about 145° C. or so, and the glass fiber had a cross-sectional diameter of about 12.5 μm or so and an aspect ratio of 24 or so.

Using the raw fabric, the molded body of FIG. 6 was manufactured in the following manner. As shown in FIG. 3, the raw fabric (1000) was placed on a first mold (3000) in which an intaglio corresponding to the concavo-convex shape of the molded body was formed. Also, a second mold (4000) in which a raised shape corresponding to the concavo-convex shape was formed was placed on the raw fabric (1000).

Subsequently, the surface temperature of the raw fabric was maintained at about 195° C. using a ceramic heater. The ceramic heater was located inside a heater riser, and was raised to the desired temperature through temperature control of a PLC (programmable logic controller) system in a state where the ceramic heater was placed at the top of the raw fabric. It was confirmed using a non-contact infrared thermometer whether the surface temperature of the raw fabric was controlled to the desired temperature.

Thereafter, the pressure was applied to the raw fabric in the form as shown in FIG. 4 by performing the suction (L) at the bottom of the first mold (3000) while maintaining the temperature, as shown in FIG. 3, and simultaneously moving the second mold (4000) to the bottom.

The suction (L) was performed by opening a gauge of the device to 100%. Based on the rate of this suction, the vacuum flow was about 1 atmosphere or so, and the pressure applied to the raw fabric is about 690.2 gf/cm$^2$ (applied load about 1500 kg) or so. In addition, the pressurization force of the second mold (4000) was set such that a pressure of about 548.7 gf/cm$^2$ (applied load about 1000 kg) was applied to the molded body formed through the suction.

The state of the first mold (3000) and the second mold (4000) as in FIG. 4 was maintained for about 10 seconds or so, and the temperature of the molded body (raw fabric) (1000) was reduced to about 40° C. to perform a cooling process.

After the cooling process, the first and second molds (3000, 4000) were separated, and the molded body was recovered.

Example 2

A molded body was manufactured in the same manner as in Example 1. However, in Example 2, the heating of the raw fabric was performed using a coil heater, and the surface temperature of the raw fabric was maintained at about 175° C. The coil heater was located inside a heater riser, and was raised to the desired temperature through temperature control of a PLC (programmable logic controller) system in a state where the heater was placed at the top of the raw fabric. It was confirmed using a non-contact infrared thermometer whether the surface temperature of the raw fabric was controlled to the desired temperature.

A molded body was manufactured in the same manner as in Example 1 except for the above contents.

Comparative Example 1

A molded body was manufactured in the same manner as in Example 1, but the molded body was manufactured without performing pressurization by the second mold (4000).

Test Example 1. Evaluation of Molding State

The cross-section of each molded body of Examples or Comparative Example was photographed with an SEM (scanning electron microscope) device (JEOL, JSM-7800F model) to evaluate moldability. The molded body was subjected to cross-section treatment with a TXP pretreatment device, and then photographed with the SEM device. Upon the above photographing, a BED-C observation mode was applied, and the magnification, working distance, and acceleration voltage were set to 100 times, 15 mm (Working Distance), and 15.0 kV, respectively. FIGS. 7 and 8 show the results for Examples 1 and 2, respectively, and FIG. 9 shows the result for Comparative Example 1.

Through comparison of FIGS. 7 to 9, it could be known that good molding was achieved without pores occurring inside in the case of Examples 1 and 2, but in the case of the molded body of Comparative Example 1, many internal pores were confirmed, and the shape of the molded body was not formed properly.

Test Example 2. Evaluation of Tensile Rupture Strength

The tensile rupture strengths of the intaglio portion and the raised portion of each plate-like molded body manufactured in Examples or Comparative Examples were evaluated. As shown in FIG. 10, specimens were manufactured by cutting the intaglio portion (rectangle filled with dots in FIG. 10) and the raised portion (rectangle filled with hatched lines in FIG. 10) of the molded body, respectively. At this time, the specimen was cut to have a horizontal length of about 45 mm and a vertical length of about 12.5 mm. As shown in the diagram, a total of 32 specimens were collected from the intaglio portion, and a total of 17 specimens were collected from the raised portion, where the tensile rupture strength described below is the average value of the tensile rupture strengths measured in the specimens.

The tensile rupture strength was measured at room temperature (about 25° C.) using a UTM (Universal Testing Machine) device. Both ends of the specimen in the transverse direction were fixed to the device by about 8 mm, and the strength at the time point when the specimen was ruptured was measured while it was stretched in the transverse direction, which was referred to as the tensile rupture strength. The stretching was performed at the constant speed with a tensile speed of about 50 mm/sec or so.

The measurement results were summarized and described in Table 1 below.

In Table 1, the deviation is a value calculated as 100×$(S_P-S_M)/S_M$ when the tensile rupture strength of the intaglio portion is set to $S_M$ and the tensile rupture strength of the raised portion is set to $S_P$.

TABLE 1

| | | Raised portion (MPa) | Intaglio portion (MPa) | Deviation |
|---|---|---|---|---|
| Example | 1 | 84.91 | 81.82 | 3.8 |
| Comparative Example | 1 | 45.61 | 44.52 | 2.4 |

Test Example 3. Evaluation of Tensile Rupture Strength

Each plate-like molded body manufactured in Examples or Comparative Example was cut into three equal lengths in the longitudinal direction (arrow direction in FIG. 10) to produce upper end, middle end, and lower end specimens, and then the tensile rupture strength of each portion was evaluated in the same manner as in Test Example 2.

At this time, the cutting of the specimens was performed using a water jet process to prevent cracking of edge portions and the like.

As shown in FIG. 10, specimens were obtained from the intaglio portion (rectangle filled with dots in FIG. 10) and the raised portion (rectangle filled with hatched lines in FIG. 10) of the molded body, respectively, and specimens were obtained from the upper end, the middle end, and the lower end, respectively in the same manner as above. The specimen was cut so that the TD (transverse direction) direction of the molded body was a horizontal direction. The TD direction is a direction based on the extrusion process for manufacturing the raw fabric. Using the above method, four specimens were collected from the intaglio portion and the raised portion of the upper end, respectively (a total of eight specimens), and the specimens were also collected from the middle end and the lower end in the same manner.

The tensile rupture strengths of the specimens were evaluated in the same manner as in Test Example 2, and the results were summarized and described in Table 2.

In Table 2 below, the strength (MPa) is the tensile rupture strength, which is the average value of the tensile rupture strengths measured for the specimens taken from each of the upper end, the middle end, and the lower end.

In addition, when the tensile rupture strength of the raw fabric is $S_R$ and the average value is $S_S$, the deviation in Table 2 below is the ratio of the average value and the tensile rupture strength of the raw fabric, which is a value calculated as $100 \times S_S/S_R$.

TABLE 2

| | | | Upper end | Middle end | Lower end |
|---|---|---|---|---|---|
| Example | 1 | Strength (MPa) | 89 | 81.82 | 90.75 |
| | | Deviation (%) | 96.24 | 88.48 | 98.13 |
| | 2 | Strength (MPa) | 81.94 | 89.94 | 87.97 |
| | | Deviation (%) | 88.60 | 97.25 | 95.12 |
| Comparative Example | 1 | Strength (MPa) | 53.96 | 44.52 | 73.37 |
| | | Deviation (%) | 58.34 | 48.14 | 79.33 |

The invention claimed is:

1. A plate-like molded body comprising:

a resin component and a filler component, wherein a concavo-convex shape including raised portions and intaglio portions is formed on the plate-like molded body, and wherein a difference in tensile rupture strength between the raised portions and the intaglio portions has an absolute value of 10% or less, wherein the tensile rupture strength of the intaglio portions is 50 MPa or more, or a change rate of the tensile rupture strength compared to a raw fabric is 80% or more, wherein the filler component comprises a fibrous filler, wherein the aspect ratio of the filler component ranges from 18 to 30, wherein the cross-sectional diameter of the filler component ranges from 5 μm to 20 μm, and wherein a glass transition temperature of the resin component is 90° C. or more.

2. A plate-like molded body comprising:

a resin component;

a filler component; and sides formed in a first direction, wherein a concavo-convex shape including raised portions and intaglio portions is formed on the plate-like molded body, wherein a tensile rupture strength in each of an upper, a middle, and a lower end obtained by trisecting the plate-like molded body in a direction perpendicular to the side in the first direction, and wherein the tensile rupture strength has standard deviation of 100 or less, wherein the filler component comprises a fibrous filler, wherein the aspect ratio of the filler component ranges from 18 to 30, wherein the cross-sectional diameter of the filler component range from 5 μm to 20 μm, and wherein a glass transition temperature of the resin component is 90° C. or more.

3. The molded body according to claim 2, wherein the tensile rupture strength of the intaglio portion is 50 MPa or more, or the change ratio of the tensile rupture strength compared to the raw fabric is 80% or more.

4. The molded body according to claim 2, wherein the resin component is a thermoplastic polymer.

5. The molded body according to claim 1, wherein the filler component is an amount of 1 to 100 parts by weight relative to 100 parts by weight of the resin component.

6. The molded body according to claim 1, wherein a thickness of the molded body ranges from 100 μm to 100 mm.

7. A heat sink comprising the plate-like molded body of claim 1.

8. A heat sink comprising the plate-like molded body of claim 2.

9. The molded body according to claim 1, wherein the resin component is a thermoplastic polymer.

10. A method for manufacturing a plate-like molded body having a concavo-convex shape including raised portions and intaglio portions, the method comprising:

a molding step of placing a raw fabric including a resin component and a filler component on intaglios of a mold, wherein the intaglios correspond to the concavo-convex shape, and applying a pressure at a top of the raw fabric while suctioning the raw fabric at a bottom of the mold, wherein the pressure application is performed by spraying gas at the top of the raw fabric.

11. The method according to claim 10, wherein the pressure application is performed by pressing the raw fabric into a raised shape of a second mold, wherein the raised shape corresponds to the intaglios of the mold.

12. The method according to claim 10, wherein in the molding step, a temperature of the raw fabric is maintained so that an absolute value of ΔT according to Equation 1 below is 50% or less:

$$\Delta T = 100 \times (Ts - Tg)/Tg \quad \text{[Equation 1]}$$

wherein, Ts is a surface temperature of the raw fabric in the molding step, and Tg is a glass transition temperature of the resin component.

13. The method according to claim 12, wherein the surface temperature of the raw fabric is controlled by a ceramic heater or a coil heater.

14. The method according to claim 10, wherein the suction at a bottom of the raw fabric and the pressure application at the top of the raw fabric are performed so that an absolute value of ΔP according to Equation 2 below is within 100%:

$$\Delta P = 100 \times (P_U - P_L)/P_L \quad \text{[Equation 2]}$$

wherein, $P_U$ is a pressure applied to the raw fabric at the top of the raw fabric, and $P_L$ is a pressure applied to the raw fabric by the suction at the bottom of the raw fabric.

15. The method according to claim 14, wherein the pressure applied to the raw fabric by the suction at the bottom of the raw fabric ranges from 100 $gf/cm^2$ to 2,000 $gf/cm^2$.

* * * * *